US008152379B2

(12) United States Patent
Takeuchi

(10) Patent No.: US 8,152,379 B2
(45) Date of Patent: Apr. 10, 2012

(54) BEARING DEVICE HAVING BACKLASH REDUCER FOR REDUCING PLAY OF BEARING, AND IMAGE RECORDING APPARATUS INCLUDING THE BEARING DEVICE

(75) Inventor: Masaru Takeuchi, Handa (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1222 days.

(21) Appl. No.: 11/738,871

(22) Filed: Apr. 23, 2007

(65) Prior Publication Data

US 2008/0014006 A1 Jan. 17, 2008

(30) Foreign Application Priority Data

May 1, 2006 (JP) ................................ 2006-127534

(51) Int. Cl.
*F16C 35/02* (2006.01)

(52) U.S. Cl. ......... 384/202; 384/215; 384/217; 384/296

(58) Field of Classification Search .................. 384/202, 384/215, 217, 295, 296, 428
See application file for complete search history.

(56) References Cited

FOREIGN PATENT DOCUMENTS

| | | | |
|---|---|---|---|
| JP | H62-297540 | A | 12/1987 |
| JP | H02-304211 | A | 12/1990 |
| JP | H04-331812 | A | 11/1992 |
| JP | H05-280512 | A | 10/1993 |
| JP | H08-225182 | A | 9/1996 |
| JP | H09-086703 | A | 3/1997 |
| JP | 2000-136823 | A | 5/2000 |
| JP | 2002-257147 | A | 9/2002 |
| JP | 2003-090337 | A | 3/2003 |
| JP | 2004-84902 | * | 3/2004 |
| JP | 2004-114345 | A | 4/2004 |
| JP | 2004-284062 | A | 10/2004 |

OTHER PUBLICATIONS

State Intellectual Property Office, Notification of First Office Action in Chinese Patent Appl'n No. 200710100995.9 (counterpart to above-captioned U.S. patent appl'n), dated Aug. 1, 2008.

Japan Patent Office; Notification of Reason for Refusal for Patent Application No. JP2006-127534, dated Mar. 11, 2011.

* cited by examiner

*Primary Examiner* — William C Joyce
(74) *Attorney, Agent, or Firm* — Baker Botts L.L.P.

(57) ABSTRACT

A bearing device include: (a) a bearing supporting a shaft, and having (a-1) a tubular body portion in which the shaft is rotatably received and (a-2) a radially projecting portion that projects from the tubular body portion outwardly in a radial direction of the tubular body portion; and (b) a bearing receiver plate having (b-1) a receiver hole in which the tubular body portion of the bearing is received, and (b-2) a cutout which extends from the receiver hole and which has an opening that opens outwardly of the bearing receiver plate, such that the bearing can be introduced into the receiver hole via the cutout. The bearing receiver plate and the radially projecting portion of the bearing cooperate with each other to establish (i) a rotation preventer preventing rotation of the bearing relative to the bearing receiver plate and (ii) a backlash reducer reducing play of the bearing relative to the bearing receiver plate. Also disclosed is an image recording apparatus including the bearing device.

10 Claims, 14 Drawing Sheets

BEARING DEVICE HAVING BACKLASH REDUCER FOR REDUCING PLAY OF BEARING, AND IMAGE RECORDING APPARATUS INCLUDING THE BEARING DEVICE

This application is based on Japanese Patent Application No. 2006-127534 filed on May 1, 2006, the content of which is incorporated hereinto by reference.

BACKGROUND OF THE INVENTION

1. Field of the Invention

The present invention relates to a bearing device for rotatably supporting a shaft.

2. Discussion of Related Art

Conventionally, in an image recording apparatus such as a printer, a shaft (that is provided for feeding a paper sheet) is inserted in a bearing that is received in a receiver hole formed through a bearing receiver plate of a frame, so that the shaft is rotatably supported by the frame via the bearing, as disclosed in JP-S62-297540-A. The bearing receiver plate has, in addition to the receiver hole, a cutout that extends from the receiver hole and opens outwardly of the bearing receiver plate, so that the bearing can be introduced into the receiver hole via the cutout. When the bearing is introduced into the receiver hole so as to be fitted at its tubular body portion (fitting portion) in the receiver hole, the bearing is rotated relative to the bearing receiver plate so as to be positioned in a predetermined position in which a protrusion and an operating arm of the bearing cooperate with each other to grip the bearing receiver plate therebetween. In this instance, a boss formed on the operating arm of the bearing is fitted in an engaging hole formed in the bearing receiver plate, whereby the bearing is fixed to the frame. This arrangement enables the shaft to be rotatably supported by the frame through the small number of the components, and permits the shaft to be easily attached and removed to and from the frame, by simply rotating the bearing relative to the frame.

SUMMARY OF THE INVENTION

However, the above-described conventional arrangement, due to presence of variations in dimensional accuracies of the components that are caused in the manufacturing process, there exists backlash or play between the bearing and the receiver hole of the frame. Further, the play between the bearing and the receiver hole is induced also by a width of the cutout, which is adapted to be close to a diameter of the receiver hole so as to permit the bearing to be introduced into the receiver hole via the cutout. The play could be reduced by an additional arrangement in which a small protrusion is provided to protrude from the tubular body portion outwardly in a radial direction of the tubular body portion so that the small protrusion is compressed when the tubular body portion is introduced into the receiver hole. However, the compression of the small protrusion is likely to cause deformation of an inner circumferential surface of the tubular body portion, thereby impeding smooth rotation of the shaft that is received on the inner circumferential surface of the tubular body portion.

The present invention was made in view of the background prior art discussed above. It is therefore a first object of the invention to provide a bearing device in which a shaft can be supported by a bearing, with reduced backlash or play of the bearing, without impediment to smooth rotation of the shaft. It is a second object of the invention to provide an image recording apparatus including the bearing device which has the above-described technical advantage. The first and second objects may be achieved according to first and second aspects of the invention, respectively, which are described below.

The first aspect of the invention provides a bearing device including: (a) a bearing supporting a shaft, and having (a-1) a tubular body portion in which the shaft is rotatably received and (a-2) a radially projecting portion that projects from the tubular body portion outwardly in a radial direction of the tubular body portion; and (b) a bearing receiver plate having (b-1) a receiver hole in which the tubular body portion of the bearing is received, and (b-2) a cutout which extends from the receiver hole and which has an opening that opens outwardly of the bearing receiver plate, such that the bearing can be introduced into the receiver hole via the cutout, wherein the bearing receiver plate and the radially projecting portion of the bearing cooperate with each other to establish (i) a rotation preventer preventing rotation of the bearing relative to the bearing receiver plate and (ii) a backlash reducer reducing play of the bearing relative to the bearing receiver plate.

In the bearing device constructed according to the first aspect of the invention, the shaft can be supported by the bearing, with play of the bearing that is reduced owing to the backlash reducer. Further, the backlash reducer is established by cooperation of the bearing receiver plate and the radially projecting portion of the bearing, rather than by cooperation of the bearing receiver plate and the tubular body portion of the bearing, so that the play between the bearing and the receiver hole can be reduced without risk of deformation of the tubular body portion of the bearing, namely, without impediment to rotation of the shaft.

According to an advantageous arrangement of the first aspect of the invention, the bearing receiver plate has a peripheral surface including a cutout defining portion that defines the cutout, wherein the backlash reducer has (ii-1) a backlash reducing face which is provided in the cutout defining portion of the peripheral surface of the bearing receiver plate, and (ii-2) a backlash reducing protrusion which is provided in the radially projecting portion of the bearing and which protrudes toward the bearing receiver plate, such that the backlash reducing protrusion is held in contact with the backlash reducing face while the tubular body portion of the bearing is received in the receiver hole of the bearing receiver plate.

In this advantageous arrangement, the backlash reducing protrusion of the bearing is held in contact with the backlash reducing face of the bearing receiver plate, whereby the play of the bearing relative to the bearing receiver plate can be further reliably reduced. The backlash reducing protrusion may be arranged to be elastically deformed while being held in contact with the backlash reducing face. Since the backlash reducing protrusion is provided in the radially projection portion of the bearing rather than in the tubular body portion of the bearing, the elastic deformation of the backlash reducing protrusion does not cause deformation of the tubular body portion which would impede smooth rotation of the shaft that is received in the tubular body portion.

The second aspect of the invention provides an image recording apparatus including: a recording portion performing a recording operation onto a recording medium; a feed roller shaft which is rotated for feeding the recording medium to the recording portion; a discharge roller shaft which is rotated for discharging the recording medium from the recording portion; and the bearing device defined in the first aspect of the invention, which supports each of at least one of the feed roller shaft and the discharge roller shaft.

BRIEF DESCRIPTION OF THE DRAWINGS

The above and other objects, features, advantages and technical and industrial significance of the present invention will be better understood by reading the following detailed description of presently preferred embodiment of the invention, when considered in connection with the accompanying drawings, in which.

DETAILED DESCRIPTION OF THE PREFERRED EMBODIMENT

Figure 1:
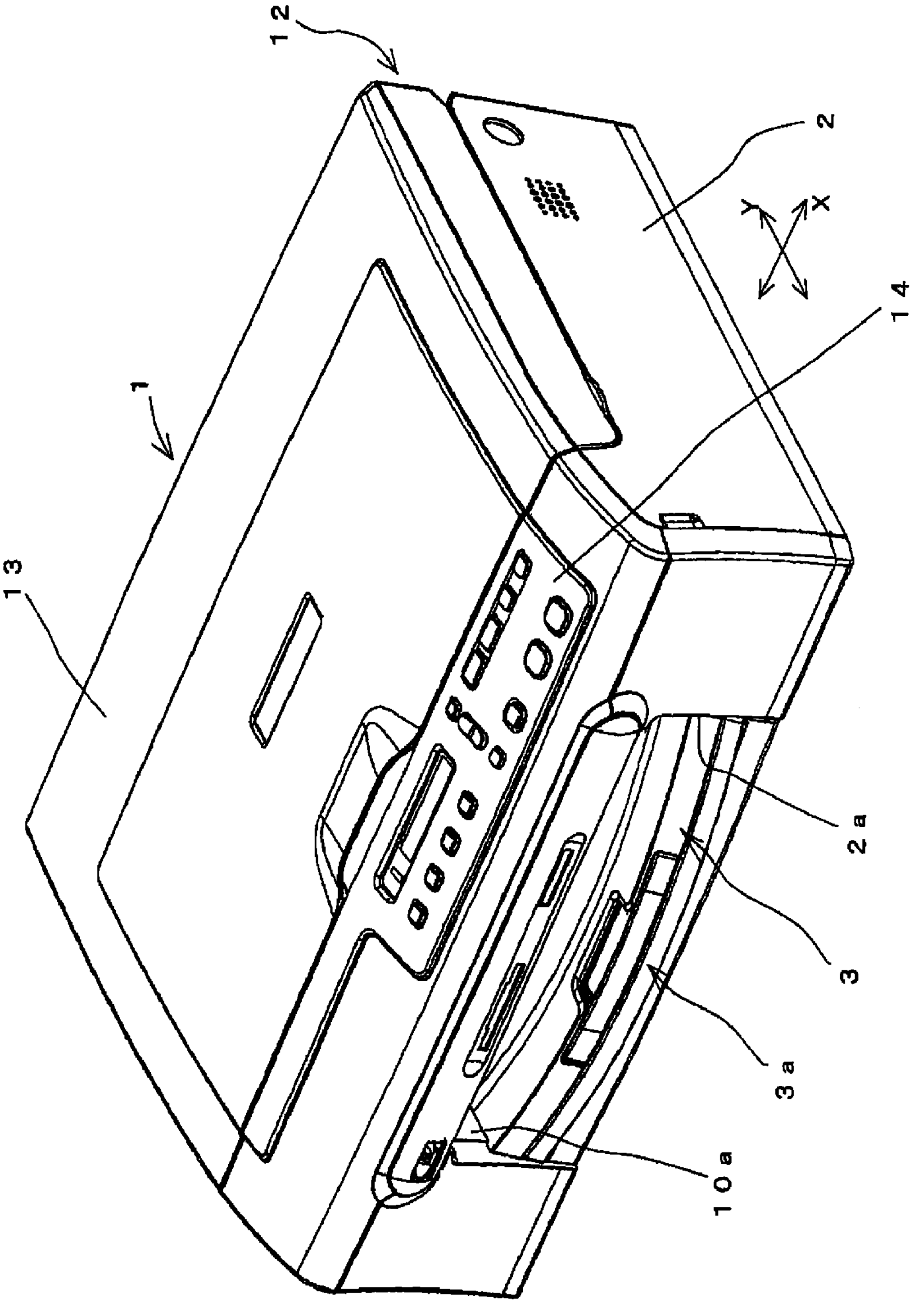
FIG. 1 is a perspective view of an image recording apparatus equipped with bearing devices each of which is constructed according to an embodiment of the present invention.

Referring to the accompanying drawings, there will be described an image recording apparatus 1 equipped with bearing devices that are constructed according to an embodiment of the present invention. The image recording apparatus 1 is a multi function device (MFD) having various functions such as printer, copier, scanner and facsimile functions. The image recording apparatus 1 has a main body 2 that is made of synthetic resin. In a bottom portion of the main body 2, there is disposed a sheet-supplying cassette 3 that can be introduced thereinto via an opening 2*a* of the main body 2. The opening 2*a* is provided in a front portion of the main body 2, as shown in FIG. 1.

In the present embodiment, the sheet-supplying cassette 3 is configured to store therein recording mediums in the form of a plurality of paper sheets P such as A4-sized, letter-sized, legal-sized and postal-sized papers. The paper sheets P are stacked in the sheet-supplying cassette 3, such that a long side of each of the stacked paper sheets P extends in a sheet feed direction (i.e., in a sub-scanning direction that is indicated as Y direction in FIG. 1) while a short side of each of paper sheet P extends in a direction perpendicular to the sheet feed direction (i.e., in a main scanning direction that is indicated as X direction in FIG. 1).

On the sheet-supplying cassette 3, there is mounted an auxiliary sheet-supplying cassette 3*a* that is configured to store therein a plurality of smaller-sized paper sheets (not shown). The auxiliary sheet-supplying cassette 3*a* is movable relative to the sheet-supplying cassette 3 in the Y direction. In a state shown in FIG. 1, the auxiliary sheet-supplying cassette 3*a* is positioned in a front end portion of the sheet-supplying cassette 3, without any portion of the auxiliary sheet-supplying cassette 3*a* projecting outwardly of the main body 2.

Figure 2:
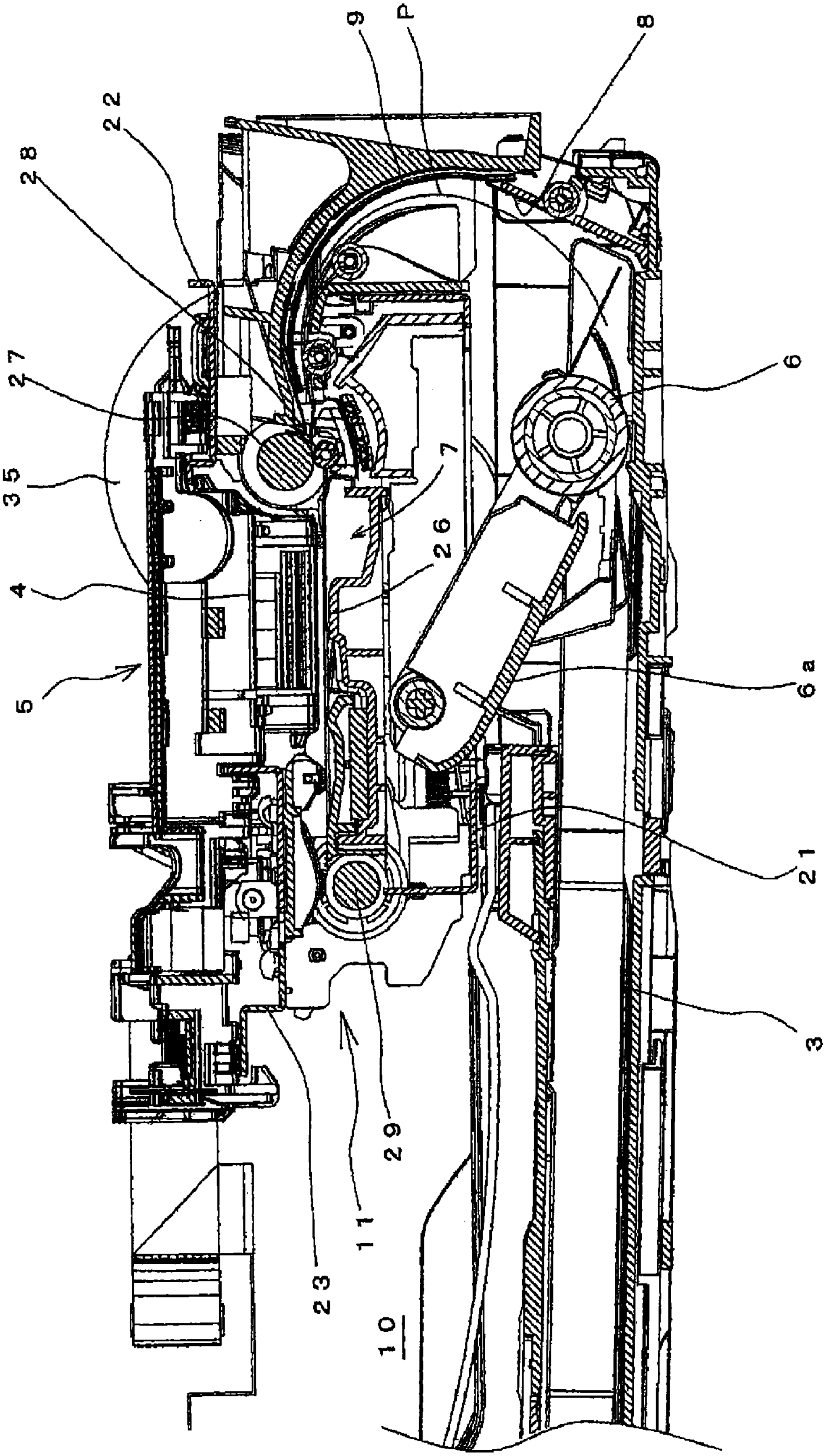
FIG. 2 is a side view in cross section of a main portion of the image recording apparatus of FIG. 1.

In a rear end portion of the sheet-supplying cassette 3 (in a right portion as seen in FIG. 2), a slant sheet-separator plate 8 is disposed. In the main body 2, an arm 6*a* is provided to be pivotable such that its distal end portion is vertically movable. A sheet supply roller 6, which is provided in the distal end portion of the arm 6*a*, cooperates with the slant sheet-separator plate 8 to supply the paper sheets P stacked in the sheet-supplying cassette 3 or the auxiliary sheet-supplying cassette 3*a*, one after another, by separating an uppermost one of the stacked paper sheets P from the other paper sheets P. The separated paper sheet P is fed along a sheet feed path in the form of a U-turn path 9 that extends generally upwardly and frontwardly from the slant sheet-separator plate 8, so as to supplied to a recording portion 7 that is located on a rear upper side of the sheet-supplying cassette 3. Thus, the paper sheets P are sequentially fed to the recording portion 7 via the slant sheet-separator plate 8.

The recording portion 7 has a carriage 5 reciprocatable in the main scanning direction, and a sheet feeding device 11 for feeding the paper sheets P. The carriage 5 carries an inkjet-type recording head 4 that is arranged to perform the printer function. The paper sheets P are sequentially fed by the sheet feeding device 11 through a sheet feed path that is defined between a lower surface of the recording head 4 and a plate-like platen 26 provided to support a currently fed one of the paper sheets P.

The paper sheets P, after having been subjected to a recoding operation performed by the recording portion 7, exit through a sheet exit portion 10 that is provided on an upper side of the auxiliary sheet-supplying cassette 3, such that a top surface (carrying a formed image or script) of each paper sheet P faces upwardly. The sheet exit portion 10 is held in communication with a sheet exit opening 10*a* which is provided in the front portion of the main body 2 and which is located on an upper side of the above-described opening 2*a*.

In an upper portion of the main body 2, there is disposed an image reading device 12 that is operable to read an image or script, for performing the copier function, scanner function and facsimile function. On an upper surface of the main body 2, there is provided an operator's control panel 14 which is provided in the front portion of the main body 2 and is equipped with various operating buttons and a liquid-crystal display. The recording portion 7 and the sheet exit portion 10 are arranged to lie within an area that is defined by the image reading device 12 and the operator's control panel 14, as seen in a plan view of the main body 2.

On the upper surface of the main body 2, there is provided also a glass plate (not shown) that is selectively covered and uncovered by a cover body 13 that is pivotably upwardly. Below the glass plate, there is provided an image scanner device (not shown) such as CIS (contact image sensor), which is operable to read an image or script carried on an original that is disposed on the glass plate. The image scanner device is reciprocatable in the main scanning direction (i.e., X direction) that is perpendicular to a drawing sheet of FIG. 2.

Figure 3:
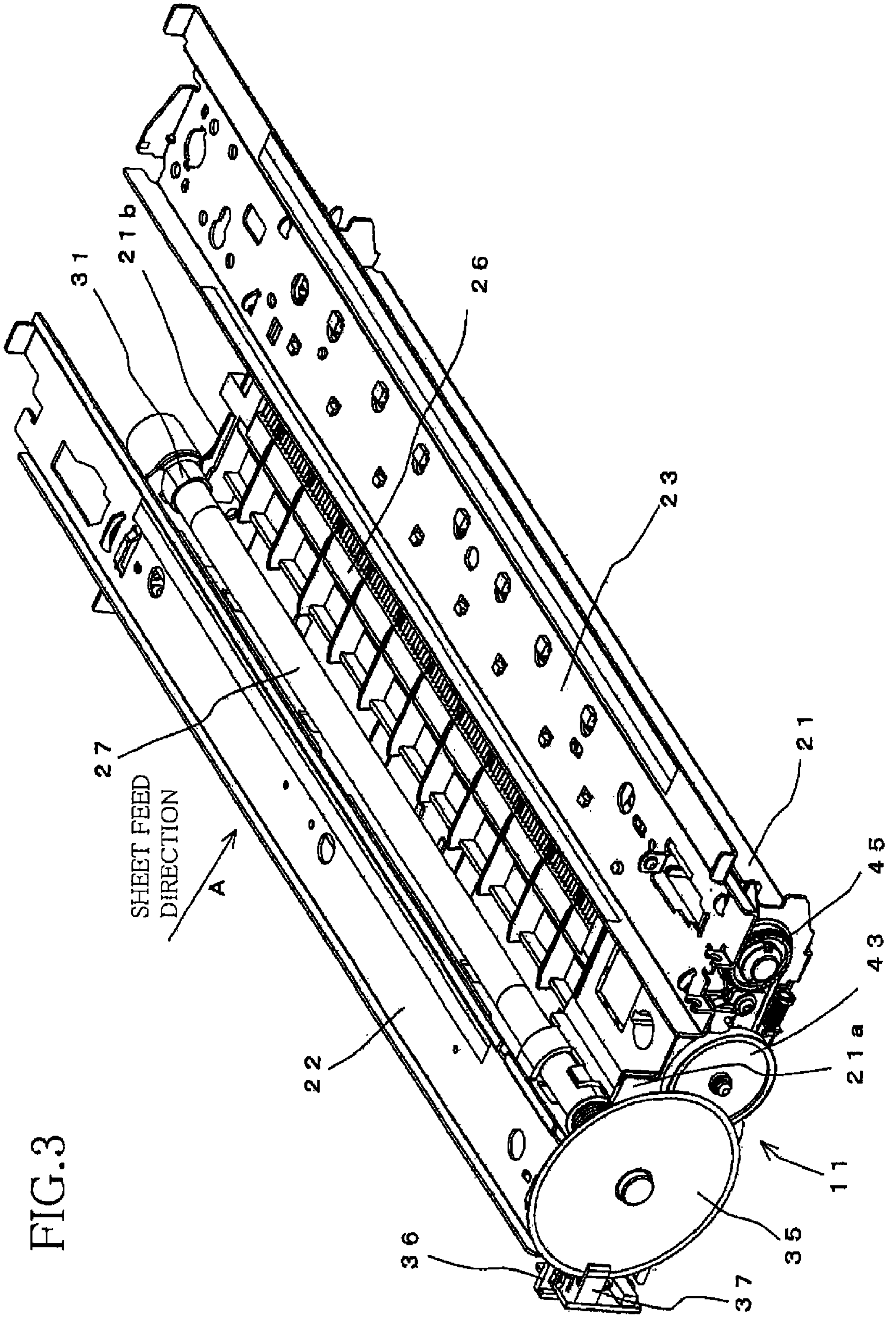
FIG. 3 is a perspective view of a feeding device that includes the bearing devices of the embodiment of the invention.
Figure 4:
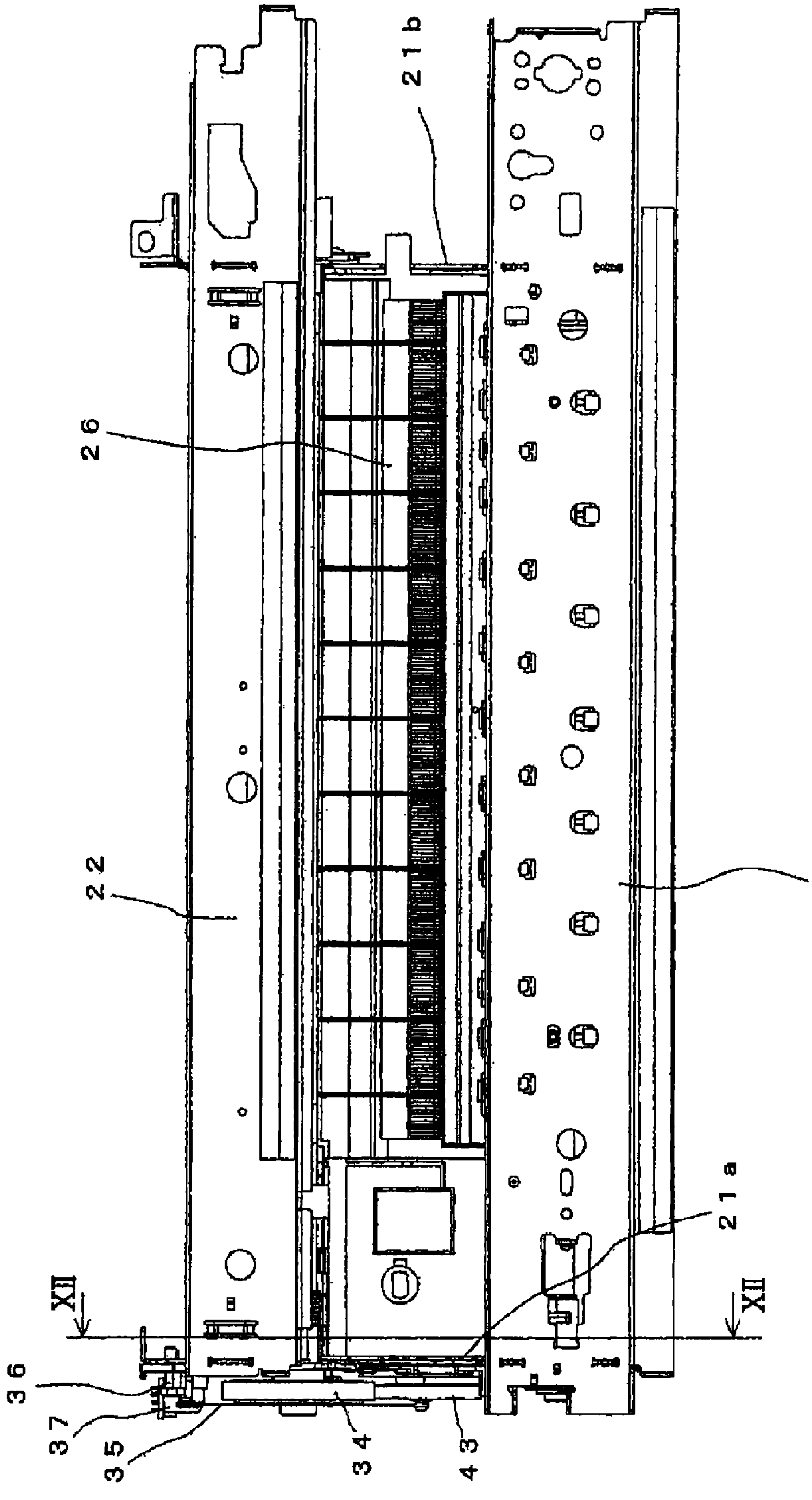
FIG. 4 is a plan view of the feeding device of FIG. 3.

The sheet feeding device 11 has a frame 21, as shown in FIGS. 2-4. The frame 21 is made of a single metal plate which is punched out to have a predetermine contour in a pressing operation and then bent to have an upwardly opening box-like shape. The frame 21 has a pair of left-side and right-side bearing receiver plates 21*a*, 21*b* that extend in the sub-scanning direction (i.e., Y direction), and first and second guide members 22, 23 that are provided by respective elongated plates extending in the main scanning direction (i.e., X direction). The first and second guide members 22, 23 bridge between upper portions of the respective bearing receiver plates 21*a*, 21*b*, and are spaced apart from each other by a spacing distance that permits the recording head 4 to be located between the first and second guide members 22, 23.

The carriage 5 straddles the first and second guide members 22, 23, and is slidably supported by the two guide members 22, 23, so as to be reciprocatable in the main-scanning direction. The plate-like platen 26, which is disposed on the lower side of the recording head 4 so as to support the currently fed paper sheet P, is disposed within the frame 21. The first guide member 22 is an upstream side of the second guide member 23, as viewed in the sheet feed direction (that is indicated by arrow A in FIG. 3) in which the paper sheets P are fed at least while being positioned above the platen 26.

On an upstream side of the platen 26, there are disposed a feed roller shaft 27 and a driven roller 28 that is held in pressing contact with an outer circumferential surface of the feed roller shaft 27. With rotation of the feed roller shaft 27, the paper sheet P gripped by the feed roller shaft 27 and the driven roller 28 is supplied into a clearance that is defined between the lower surface (i.e., nozzle defining surface) of the recording head 4 and the platen 26. On a downstream side of the platen 26, there are disposed a discharge roller shaft 29 and spur wheels (rowels) (not shown). The spur wheels as driven rollers are to be in contact with the top surface of the paper sheet P, while the discharge roller shaft 29 is located on a lower side of the paper sheet P. The discharge roller shaft 29 cooperate with the spur wheels to feed the paper sheet P that has been subjected to the recording operation, toward the sheet exit portion 10.

Figure 7:
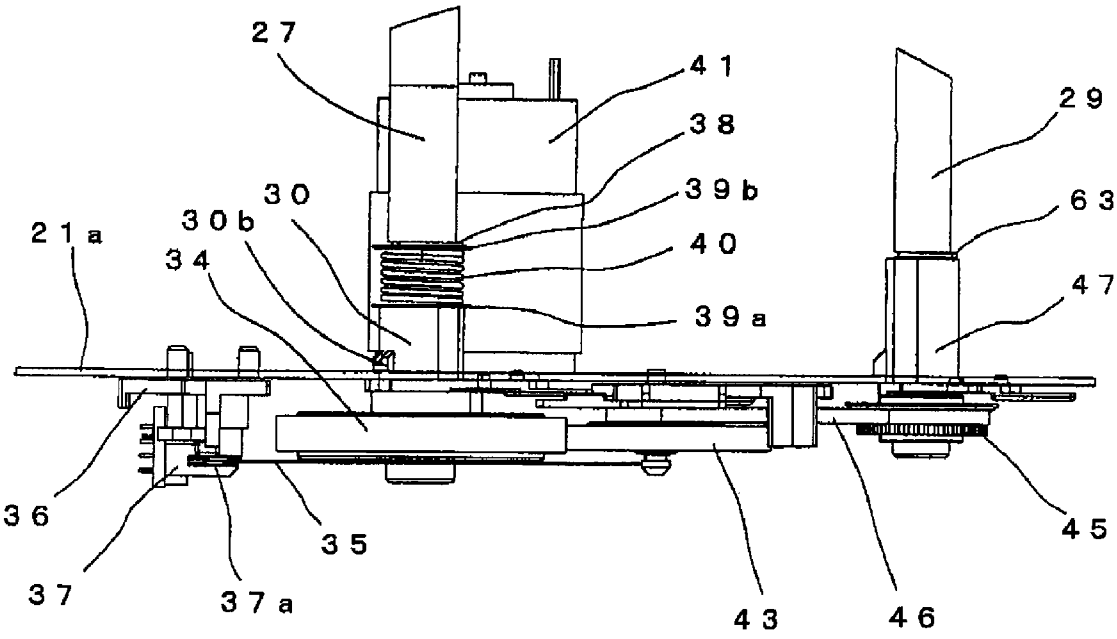
FIG. 7 is a plan view showing a part of the feeding device of FIG. 3.

As shown in FIGS. 3 and 7, the feed roller shaft 27 is rotatably held by the frame 21, via bearings 30, 31 which are formed of synthetic resin and which are respectively provided in the right-side and left-side bearing receiver plates 21*a*, 21*b* of the frame 21, as shown in FIGS. 3 and 7.

Figure 8:
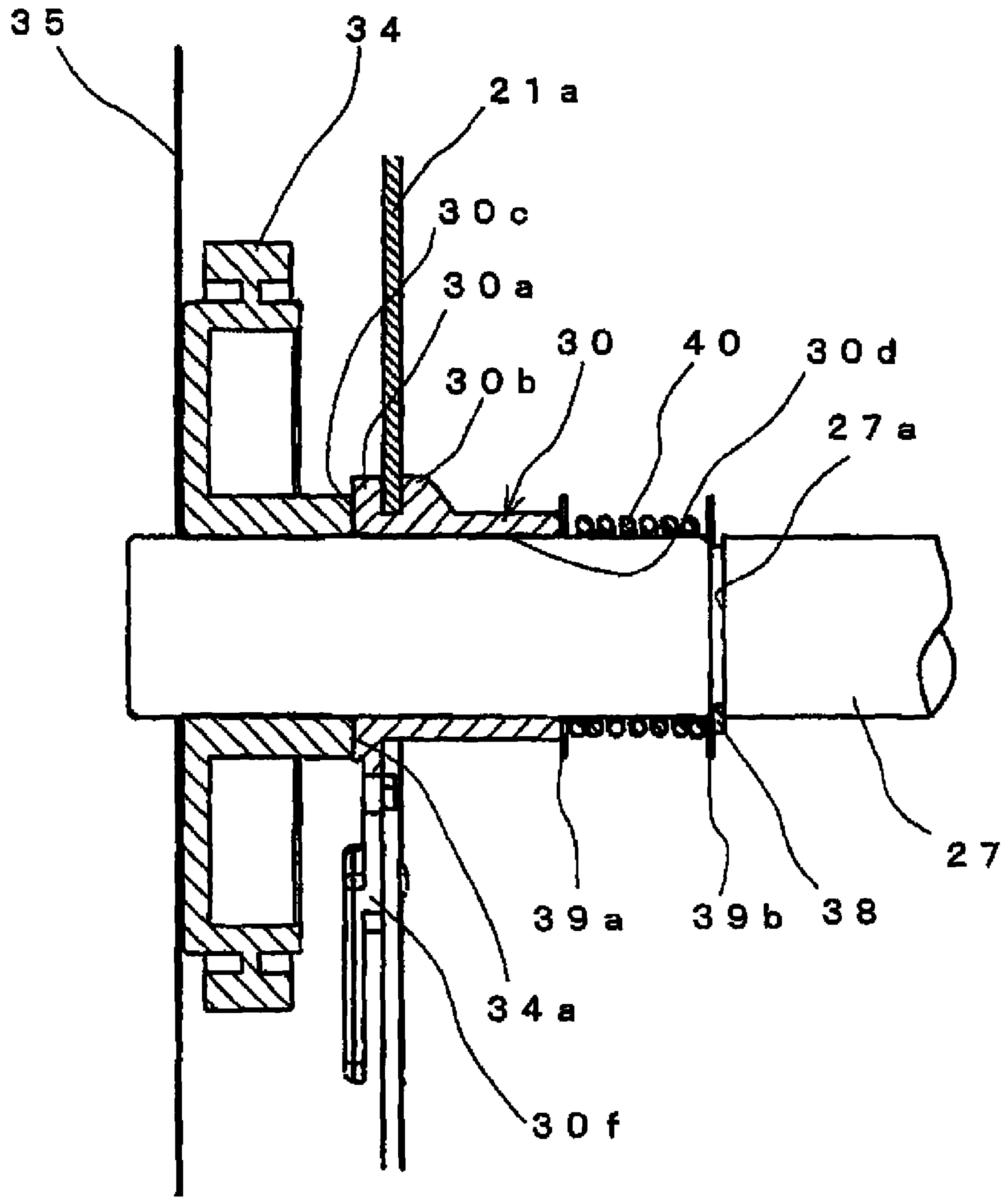
FIG. 8 is a cross sectional view taken along line VIII-VIII of FIG. 5.
Figure 10:
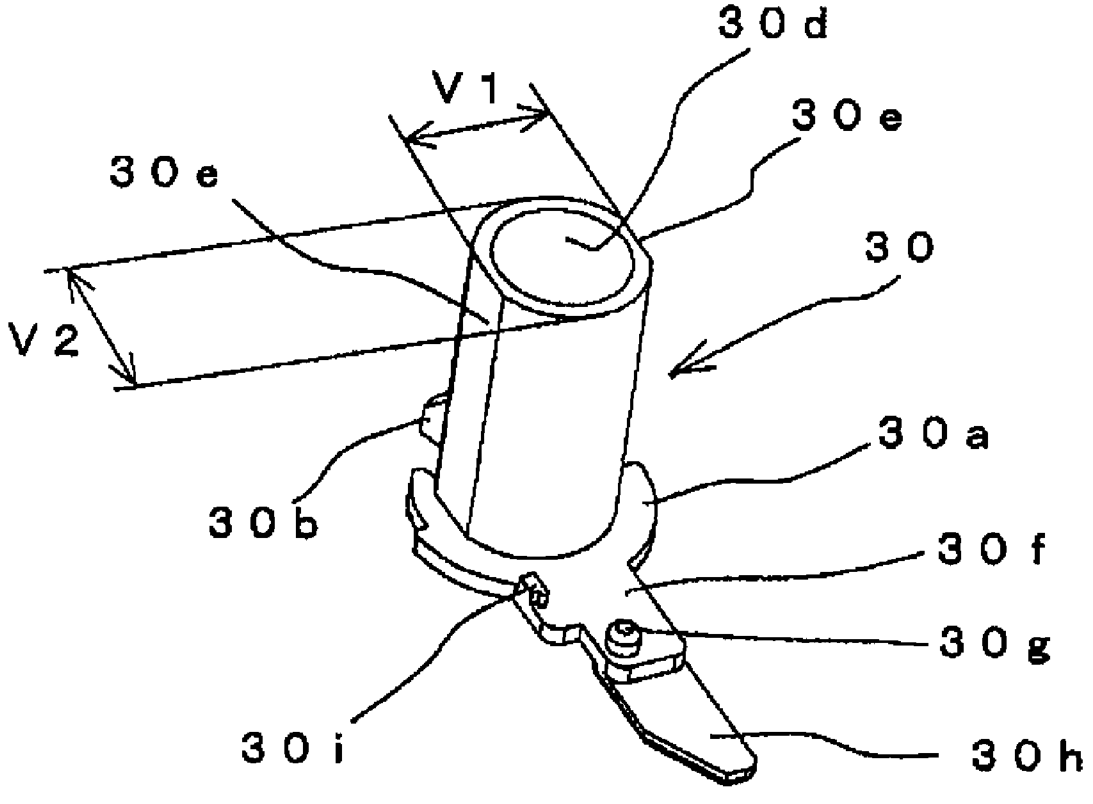
FIG. 10 is a perspective view of a bearing of one of the bearing devices of the embodiment of the invention.

The bearing 30 has a tubular body portion in which the feed roller shaft 27 is rotatably received, and a radially projecting portion that projects from the tubular body portion outwardly in a radial direction of the tubular body portion, as shown in FIGS. 8 and 10. A flange portion 30*a* as a part of the radially projecting portion is brought into in contact with an outside surface of the left-side bearing receiver plate 21*a*, when the bearing 30 is mounted on the left-side bearing receiver plate 21*a*. The bearing 30 further has an engaging protrusion 30*b* which projects radially outwardly from the tubular body portion and which is spaced apart from the flange portion 30*a* in an axial direction of the tubular body portion by a distance corresponding to a thickness of the left-side bearing receiver plate 21*a*. The engaging protrusion 30*b* is brought into contact with an inside surface of the left-side bearing receiver plate 21*a*, when the bearing 30 is mounted on the left-side bearing receiver plate 21*a*. Thus, the flange portion 30*a* and the engaging protrusion 30*b* cooperate with each other to limit movement of the bearing 30 relative to the frame 21 in the axial direction of the tubular body portion. It is noted that the bearing 31 mounted on the right-side bearing receiver plate 21*b* has substantially the same construction as the bearing 30 so that an axial movement of the bearing 31 is limited.

The bearing 30 has a shaft receiver hole 30*d* formed through the tubular body portion, and the feed roller shaft 27 is received in the shaft receiver hole 30*d*. The feed roller shaft 27 is rotatable relative to the bearing 30 that serves as a slide bearing.

The feed roller shaft 27 has an end portion which projects out from the bearing 30 and which is located outside the frame 21. A helical gear 34 is fixedly mounted on the end portion of the feed roller shaft 27, by means of press-fitting or suitable set screw.

Figure 5:
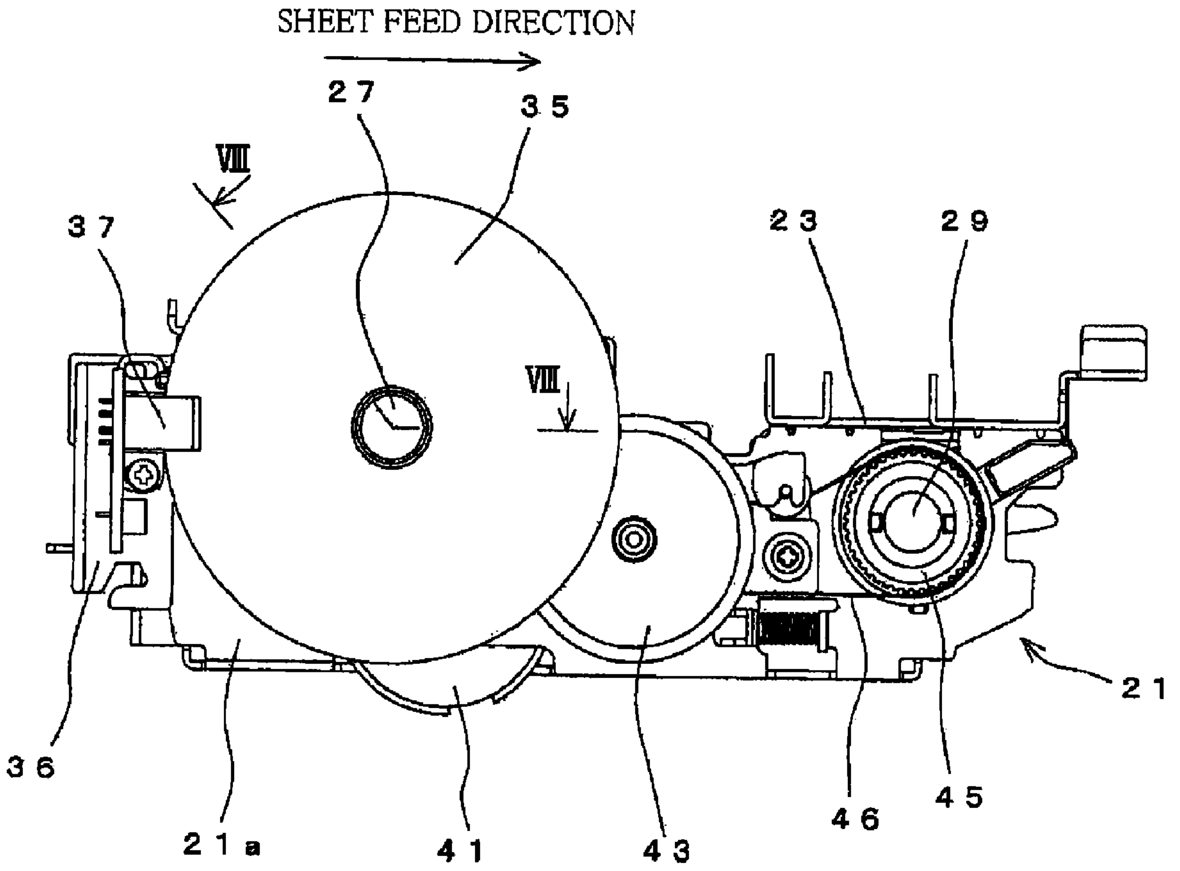
FIG. 5 is a side view of the feeding device of FIG. 3.
Figure 6:
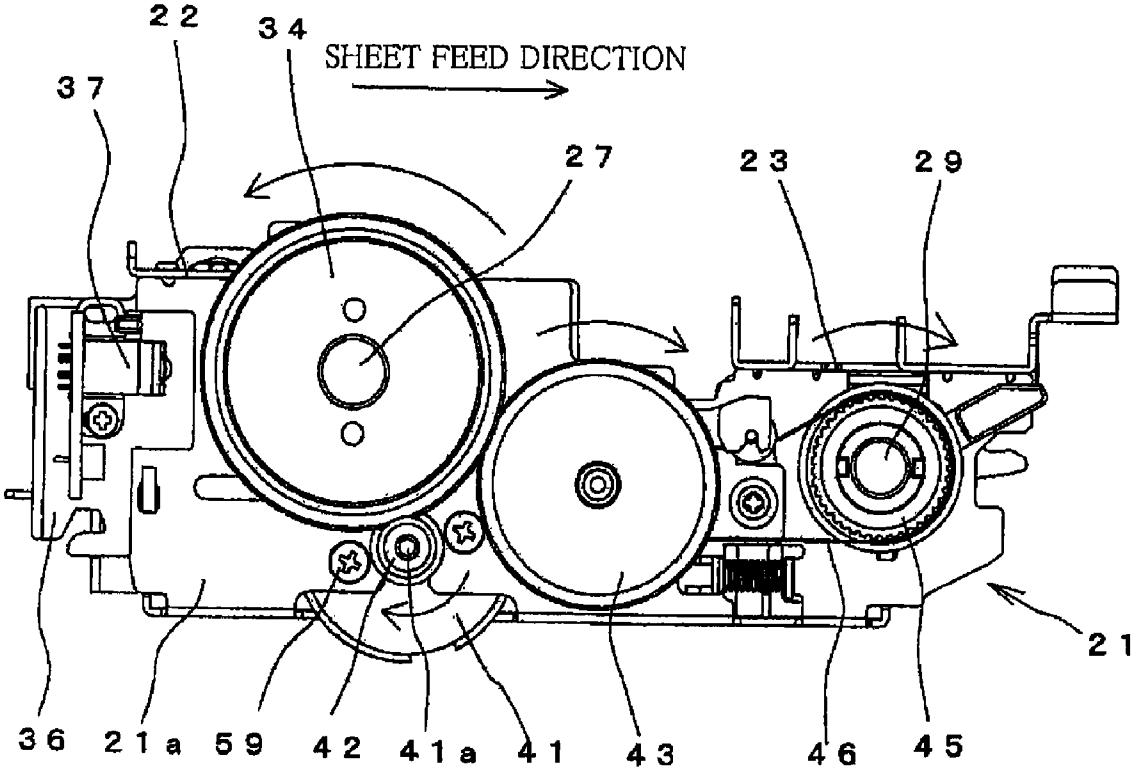
FIG. 6 is a side view of the feeding device of FIG. 3, with a rotary disk of a rotary encoder being cut away from the feeding device.

A rotary disk 35 is disposed on a side face (axially end face) of the helical gear 34, so as to be coaxial with the feed roller shaft 27. Meanwhile, as shown in FIGS. 5-7, a rotation detector 37 is attached to the left-side bearing receiver plate 21*a* of the frame 21 through a detector holder 36. The rotary disk 35 and the detector 37 cooperate with each other to constitute a rotary encoder for detecting an angular position and a rotational velocity of the feed roller shaft 27. The rotation detector 37 has a known construction arranged to detect rotation of the rotary disk 35 that passes through a slit 37*a* formed in the rotation detector 37, in an optical or magnetic non-contact manner, and to output a signal that represents the detected rotation of the rotary disk 35 that is rotated together with the feed roller shaft 27.

The feed roller shaft 27 has an annular groove 27*a* formed in its outer circumferential surface and extending in its circumferential direction. The annular groove 27*a* is located inside the frame 21, and is axially spaced apart from the helical gear 34 by a predetermined distance. A retainer ring 38 such as a snap ring, a pair of plain washers 39*a*, 39*b* and a coil spring 40 are mounted on the feed roller shaft 27. The coil spring 40 is interposed between the pair of washers 39*a*, 39*b*, which are interposed between the bearing 30 and the retainer ring 38 that is fitted on the annular groove 27*a*.

The coil spring 40 is compressed by the pair of washers 39*a*, 39*b*, and generates a biasing force that axially biases the feed roller shaft 27 in a direction that cause an axial end face 34*a* of the helical gear 34 (that is fixed to the shaft 27) to be forced against a reference axial end face 30*c* of the bearing 30.

To the inside surface of the left-side bearing receiver plate 21*a* of the frame 21, a drive motor 41 is attached by means of a plurality of screws 59 (see FIG. 6). The drive motor 41, which is operable to feed the paper sheets P, is held by the frame 21 such that its drive shaft 41*a* is parallel to the feed roller shaft 27. The drive shaft 41*a* projects from the left-side bearing receiver plate 21*a* of the frame 21, outwardly of the frame 21. A drive helical gear 42 is fixedly mounted on the drive shaft 41*a*, and meshes with the driven helical gear 34 that is fixedly mounted on the feed roller shaft 27.

With rotation of the drive motor 41, a thrust force is applied to the feed roller shaft 27 due to the meshing of the helical gears 34, 42. In the present embodiment, when the drive motor 41 is rotated in its forward direction (as indicated by arrow in FIG. 6) for feeding the paper sheets P in the sheet feed direction, the thrust force acts on the feed roller shaft 27 in a direction that causes the axial end face 34*a* of the helical gear 34 to be forced in a direction away from the reference axial end face 30*c* of the bearing 30. That is, teeth of each of the helical gears 34, 42 are twisted with respect to its axis in a direction that causes the helical gear 34 to be forced in a direction away from the bearing 30 when the drive motor 41 is rotated in the forward direction. The coil spring 40 is constructed such that the biasing force generated by the coil spring 40 is larger than the thrust force applied to the feed roller shaft 27 during rotation of the drive motor 41 in the forward direction.

The driven helical gear 34 meshes with, in addition to the drive helical gear 42, an idle helical gear 43 that is also rotatably held by the left-side bearing receiver plate 21*a* of the frame 21. The idle helical gear 43 is integrally formed with a timing-belt pulley (not shown) that has grooves cut on its outer circumferential surface.

The discharge roller shaft 29 is rotatably held by the frame 21, via bearings 47 (one of which is not shown) provided in the respective right-side and left-side bearing receiver plates 21*a*, 21*b* of the frame 21, such that the discharge roller shaft 29 is held in parallel to the feed roller shaft 27. The discharge roller shaft 29 has an end portion which projects out from the bearing 47 and which is located outside the frame 21. A driven pulley 45, which is provided by a timing-belt pulley having grooves cut on its outer circumferential surface, is mounted on the end portion of the discharge roller shaft 29. This driven pulley 45 and the above-described timing-belt pulley integrally formed with the idle helical gear 43 are connected via an endless timing belt 46 (having teeth formed in its inside surface) that are wound on the two pulleys.

In the present embodiment, the above-described feed roller shaft 27, left-side bearing receiver plate 21*a* and bearing 30 cooperate with each other to constitute one of a pair of first bearing devices as the bearing devices, while the feed roller shaft 27, right-side bearing receiver plate 21*b* and bearing 31 cooperate with each other to constitute the other of the pair of the first bearing device. In each of the first bearing devices, a corresponding one of the bearing receiver plates 21*a*, 21*b* and the radially projecting portion of a corresponding one of the bearings 30, 31 cooperate with each other to establish a rotation preventer for preventing rotation of the corresponding bearing relative to the corresponding bearing receiver plate and a backlash reducer for reducing play of the bearing relative to the bearing receiver plate. Further, in the present embodiment, the above-described discharge roller shaft 29, left-side bearing receiver plate 21*a* and bearing 47 cooperate with each other to constitute one of a pair of second bearing devices as the bearing devices, while the discharge roller shaft 29, left-side bearing receiver plate 21*b* and bearing 47 cooperate with each other to constitute the other of the pair of the second bearing device. In each of the second bearing devices, the rotation preventer and the backlash reducer are both established by cooperation of a corresponding one of the bearing receiver plates 21*a*, 21*b* and the radially projecting portion of a corresponding one of the bearings 47, 47. Hereinafter, the bearing devices will be described in detail, referring to FIGS. 9-14.

Figure 9:
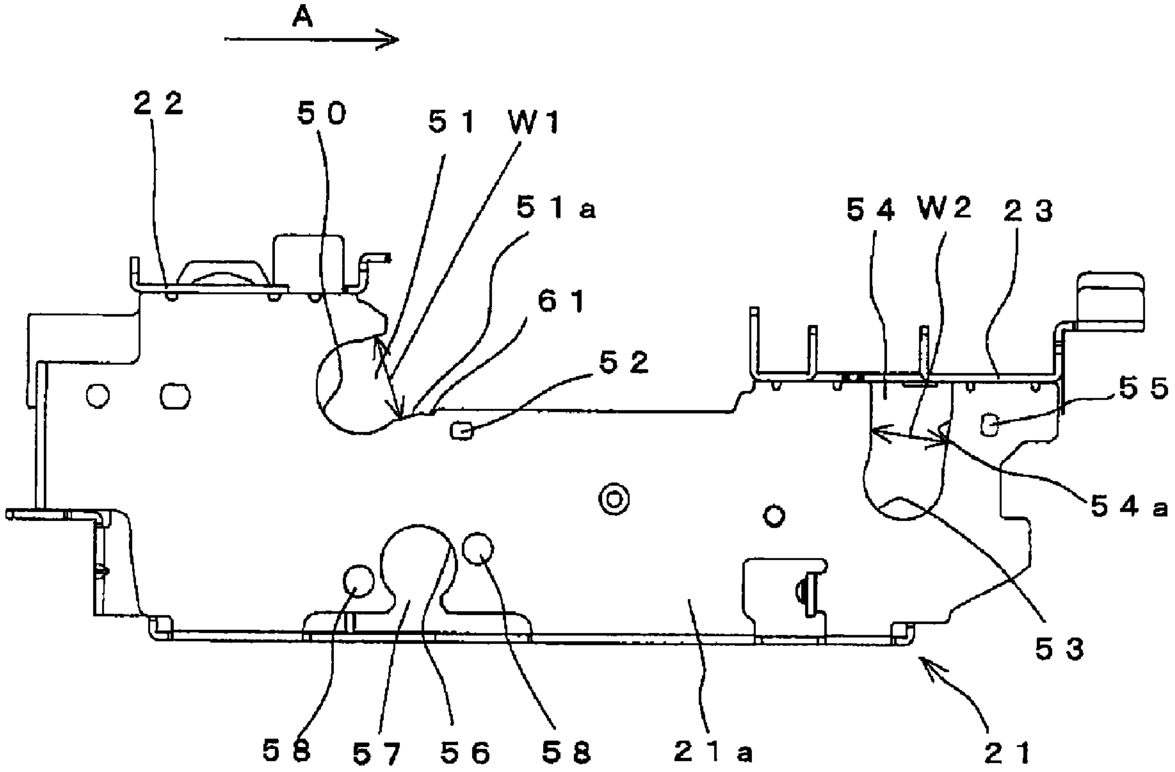
FIG. 9 is a side view of a frame of the feeding device of FIG. 3.

As shown in FIG. 9, the bearing receiver plate 21*a* of the frame 21 has a receiver hole 50 in which the tubular body portion of the bearing 30 is received. The bearing receiver plate 21*a* further has a cutout 51 which is contiguous to the receiver hole 50 and which extends outwardly in a radial direction of the receiver hole 50, from the receiver hole 50 toward outside the bearing receiver plate 21*a*. That is, the cutout 51 has an opening that opens outwardly of the bearing receiver plate 21*a*. The cutout 51 is defined by a cutout defining portion of a peripheral surface of the bearing receiver plate 21*a*. The direction (hereinafter referred to as "cutout extending direction" where appropriate) in which the cutout 51 extends from the receiver hole 50 includes a component parallel to the sheet feed direction that is indicated by arrow A in FIG. 9. The cutout 51 has a width W1 as measured in a direction perpendicular to the cutout extending direction, wherein the width W1 is slightly smaller than a diameter of the receiver hole 50.

Meanwhile, as shown in FIG. 10, the tubular portion of the bearing 30 has an outer circumferential surface including two flat portions 30*e*, 30*e* which are diametrically opposed to each other. The two flat portions 30*e*, 30*e* are diametrically spaced apart from each other by a distance V1 that is slightly smaller than the above-described width W1 of the cutout 51. Therefore, the bearing 30 can be easily introduced into the receiver hole 50 via the cutout 51, by bringing the two flat portions 30*e*, 30*e* into substantially parallel to the cutout extending direction.

The bearing 30 includes: an arm portion 30*f* as a part of the above-described radially projecting portion; a rotation preventing protrusion 30*g* protruding from the arm portion 30*f* toward the bearing receiver plate 21*a*; and an operating lever portion 30*h* as another part of the radially projecting portion. The operating lever portion 30*h* extends from the arm portion 30*f* outwardly in a radial direction in the radial direction of the tubular body portion.

As shown in FIG. 9, the bearing receiver plate 21*a* further has a rotation preventing hole 52 that is provided by an elongated hole formed through the bearing receiver plate 21*a*. While the tubular body portion of the bearing 30 is received in the receiver hole 50, the rotation preventing protrusion 30*g* is received in the rotation preventing hole 52, for thereby limiting or preventing rotation of the bearing 30 relative to the frame 21. The rotation preventing hole 52 is located in a position, which causes the two flat portions 30*e*, 30*e* of the bearing 30 to be inclined with respect to the above-described cutout extending direction in which the cutout 51 extends from the receiver hole 50 when the rotation preventing protrusion 30*g* is received in the rotation preventing hole 52. That is, after the bearing 30 has been introduced into the receiver hole 50 via the cutout 51, with the two flat portions 30*e*, 30*e* being held in substantially parallel to the cutout extending direction, the bearing 30 is rotated relative to the frame 21, for introducing the rotation preventing protrusion 30*g* into the rotation preventing hole 52. Thus, once the rotation preventing protrusion 30*g* is introduced in the rotation preventing hole 52, the two flat portions 30*e*, 30*e* of the bearing 30 are no longer parallel to the above-described cutout extending direction, namely, are no longer parallel to the above-described cutout defining portion of the peripheral surface of the bearing receiver plate 21*a*. Therefore, it is possible to prevent removal of the bearing 30 from the receiver hole 50 via the cutout 51, since the width W1 of the cutout 51 is smaller than a width (outside diameter) V2 of the tubular portion of the bearing 30 as measured at portions other than the flat portions 30*e*, 30*e*.

The bearing 30 further includes a backlash reducing protrusion 30*i* formed on the arm portion 30*f* such that a distance of the backlash reducing protrusion 30*i* from the tubular body portion is smaller than a distance of the rotation preventing protrusion 30*g* from the tubular body portion. Meanwhile the bearing receiver plate 21*a* has a backlash reducing face 51*a* that is provided in the cutout defining portion of the peripheral surface. The backlash reducing face 51*a* has a recess 61 to include a recessed portion 61*a*, such that the backlash reducing protrusion 30*i* is held in contact or engagement with the recessed portion 61*a* while the tubular portion of the bearing 30 is received in the receiver hole 50 with the rotation preventing protrusion 30*g* being received in the rotation preventing hole 52.

In the present embodiment, while the backlash reducing protrusion 30*i* is held in engagement with the recessed portion 61*a* of the backlash reducing face 51*a*, the backlash reducing protrusion 30*i* is elastically deformed in a direction including a component which is parallel to the above-described cutout extending direction and which is directed toward the receiver hole 50.

In introduction of the bearing 30 into the receiver hole 50, even after the rotation preventing protrusion 30*g* has been received in the rotation preventing hole 52, there still exists backlash or play between the bearing 30 and the receiver hole 50, particularly, in the cutout extending direction. This play between the bearing 30 and the receiver hole 50 can be effectively reduced by the elastic deformation of the backlash reducing protrusion 30*i* that has the direction including the above-described component, since the outer circumferential surface of the tubular body portion of the bearing 30 is biased or forced against an inner circumferential surface of the receiver hole 50, in an inward direction away from the opening of the cutout 51, by reaction of the elastically deformed backlash reducing protrusion 30*i*.

However, the elastic deformation of the backlash reducing protrusion 30*i* is not essential. That is, the bearing 30 and the bearing receiver plate 21*a* may be formed with high accuracy such that the play between the bearing 30 and the receiver hole 50 can be eliminated by simply bringing the backlash reducing protrusion 30*i* into contact or engagement with the recessed portion 61*a* of the recess 61, without causing the backlash reducing protrusion 30*i* to be elastically deformed.

In the present embodiment, for enabling the backlash reducing protrusion 30*i* to be elastically deformed in the direction including the component parallel to the above-described cutout extending direction, the recess 61 is formed in the backlash reducing face 51*a*. This is because it is difficult to cause the direction of the elastic deformation of the backlash reducing protrusion 30*i* to include the component parallel to the above-described cutout extending direction, in an arrangement in which the backlash reducing protrusion 30*i* is held in contact or engagement with a non-recessed portion of the backlash reducing face 51*a*. However, the formation of the recess 61 in the backlash reducing face 51*a* is not essential, if it is possible to cause the direction of the elastic deformation of the backlash reducing protrusion 30*i* to include the component parallel to the above-described cutout extending direction, for example, by suitably determining the cutout extending direction, even in the arrangement in which the backlash reducing protrusion 30*i* is held in contact or engagement with the non-recessed portion of the backlash reducing face 51*a*.

As shown in FIG. 9, the bearing receiver plate 21*a* of the frame 21 further has a receiver hole 53 (in which the bearing 47 is received) and a cutout 54 which is contiguous to the receiver hole 53 and which extends outwardly in a radial direction of the receiver hole 53, from the receiver hole 53 toward outside the bearing receiver plate 21*a*. That is, the cutout 54 has an opening that opens outwardly of the bearing receiver plate 21*a*. The cutout 54 is defined by a cutout defining portion of the peripheral surface of the bearing receiver plate 21*a*. The direction (hereinafter referred to as "cutout extending direction" where appropriate) in which the cutout 54 extends from the receiver hole 53 is almost perpendicular to the sheet feed direction that is indicated by arrow A in FIG. 9. The cutout 51 has a width W2 as measured in a direction perpendicular to the cutout extending direction, wherein the width W2 is slightly smaller than a diameter of the receiver hole 53. The opening of the cutout 54 is closed by the second guide member 23.

Figure 11:
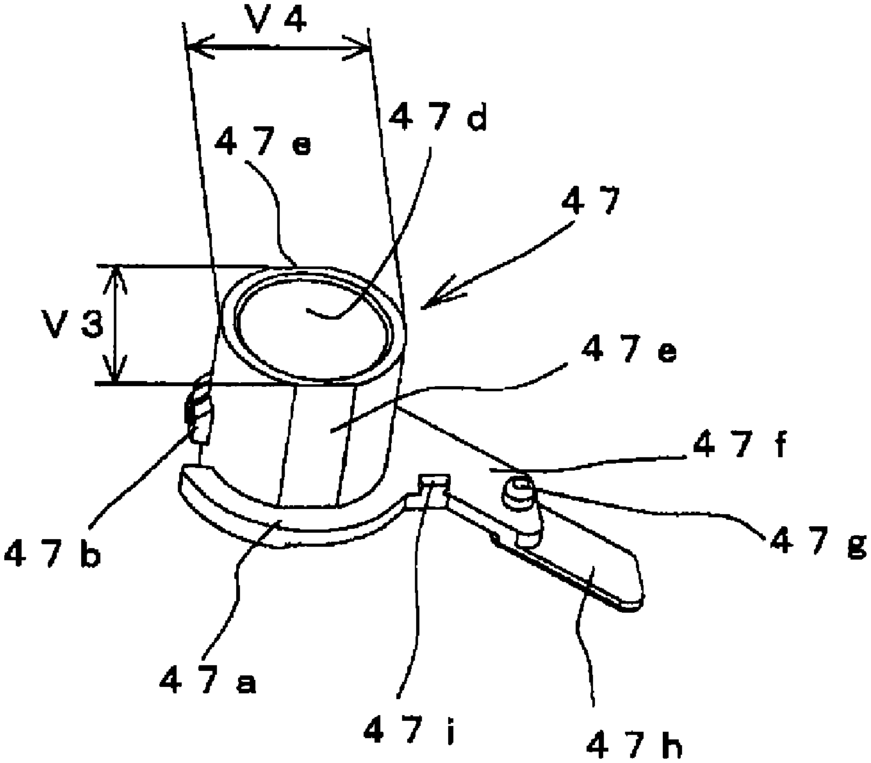
FIG. 11 is a perspective view of a bearing of the other bearing device of the embodiment of the invention.
Figure 12:
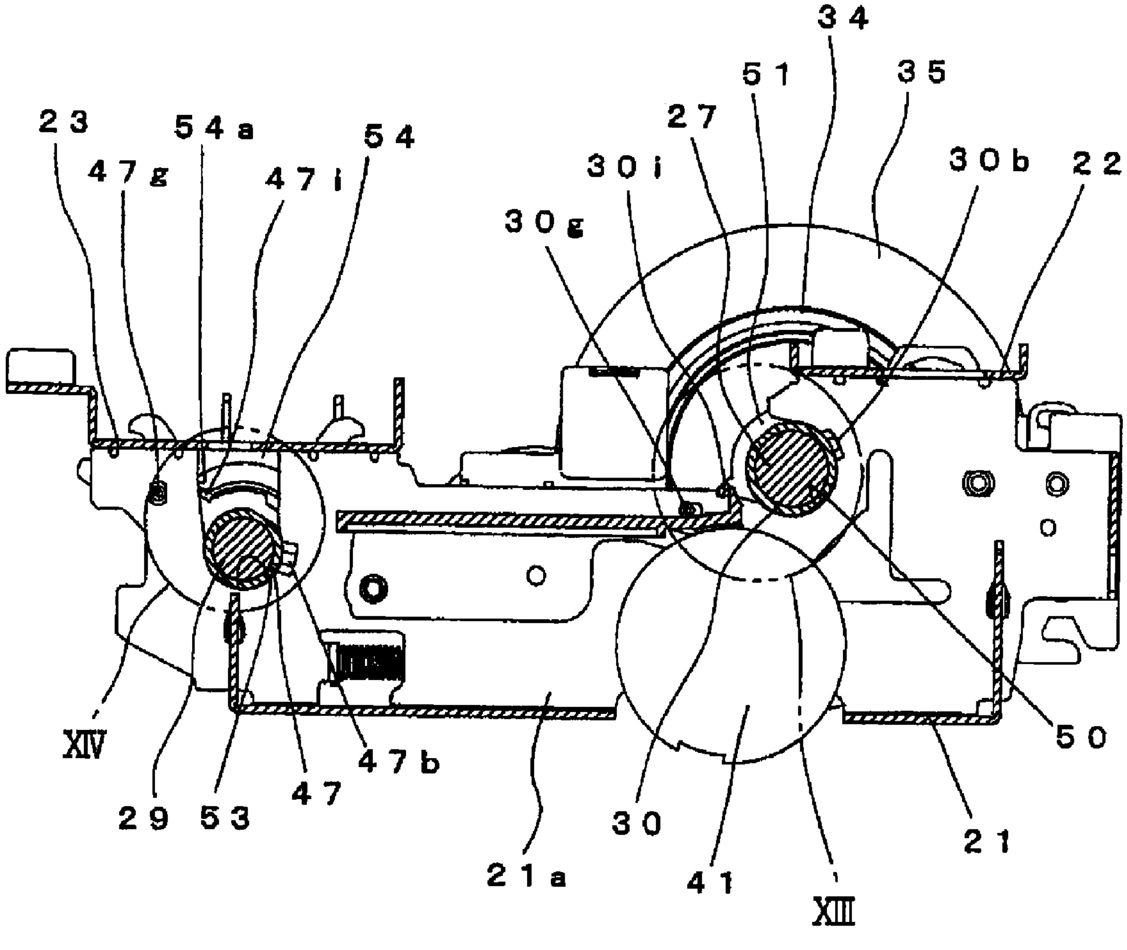
FIG. 12 is a cross sectional view taken along line XII-XII of FIG. 4.
Figure 13:
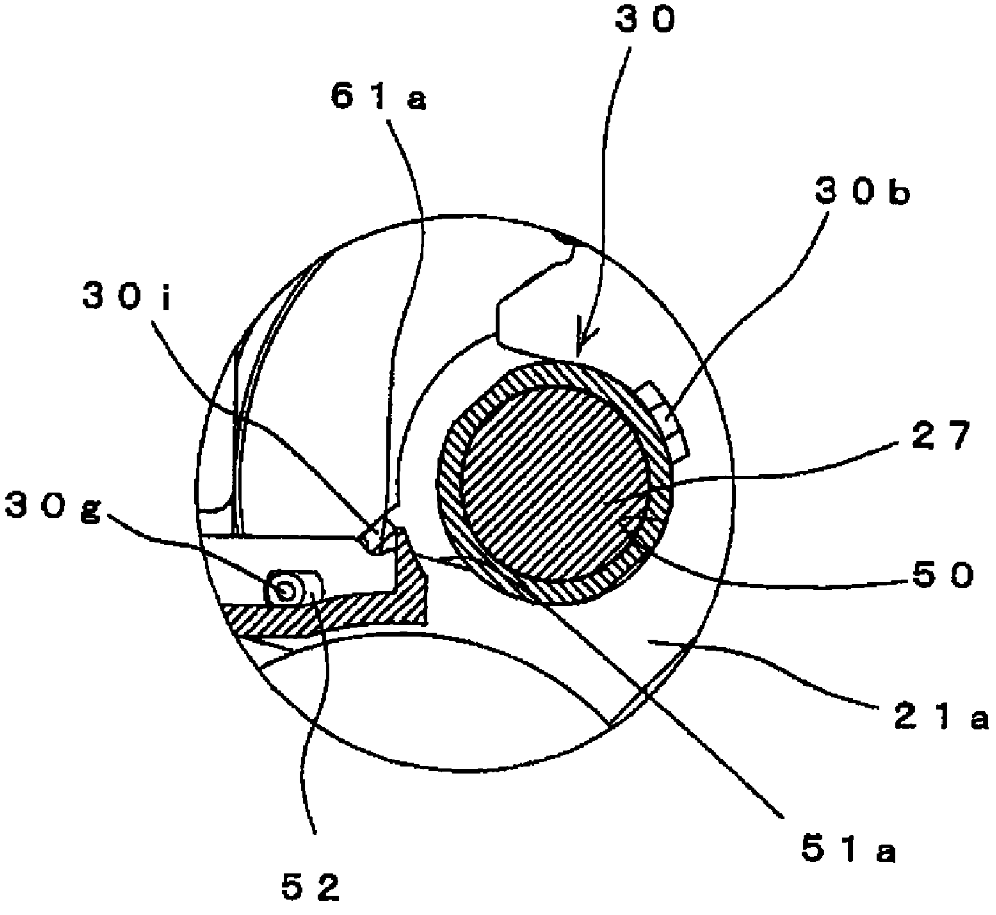
FIG. 13 is an enlarged view showing a part XIII of FIG. 12.
Figure 14:
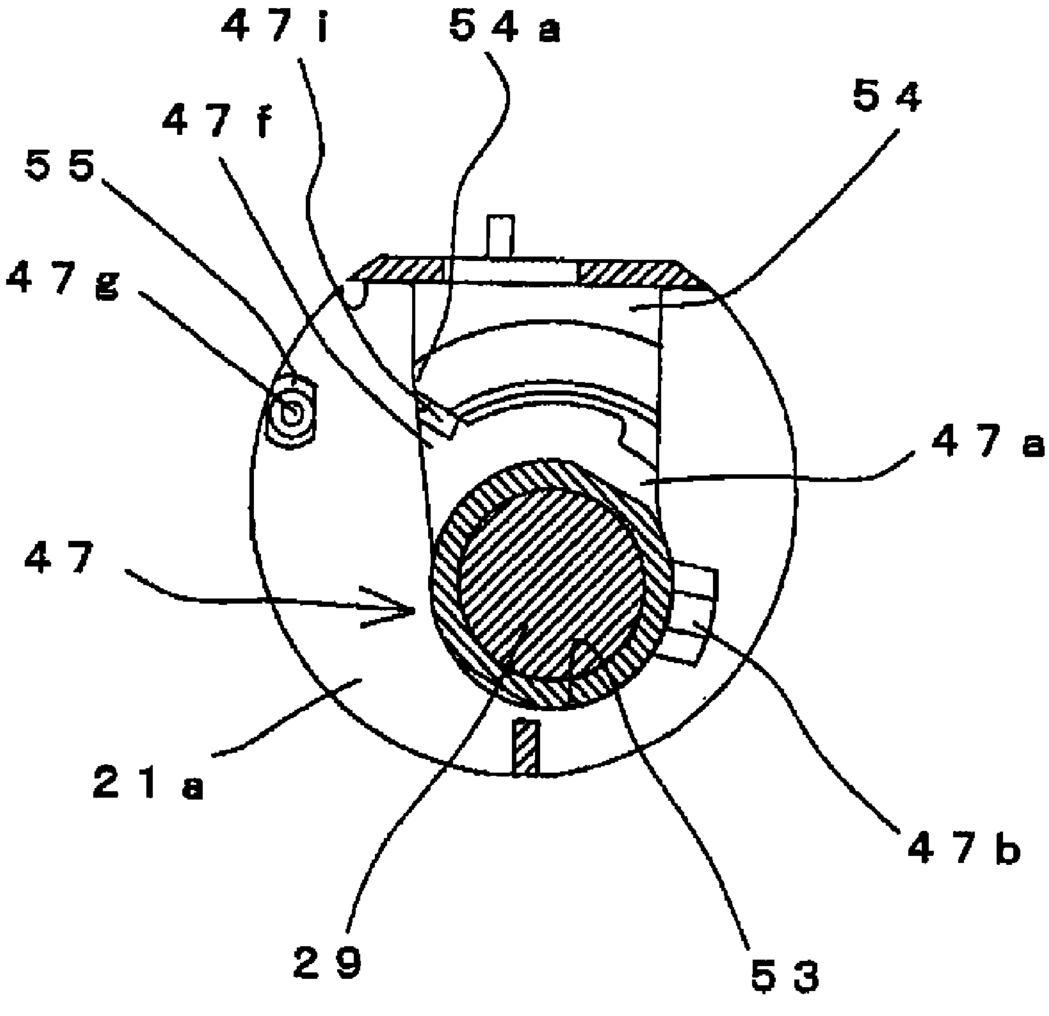
FIG. 14 is an enlarged view showing a part XIV of FIG. 12.

Like the bearing 30, the bearing 47 has a tubular body portion in which the discharge roller shaft 29 is rotatably received, and a radially projecting portion that projects from the tubular body portion outwardly in a radial direction in a radial direction of the tubular body portion, as shown in FIG. 11, A flange portion 47*a* as a part of the radially projecting portion is brought into in contact with the outside surface of the left-side bearing receiver plate 21*a*, when the bearing 47 is mounted on the left-side bearing receiver plate 21*a*. The bearing 47 further has an engaging protrusion 47*b* which projects radially outwardly from the tubular body portion and which is spaced apart from the flange portion 47*a* in an axial direction of the tubular body portion by a distance corresponding to a thickness of the left-side bearing receiver plate 21*a*. The engaging protrusion 47*b* is brought into contact with the inside surface of the left-side bearing receiver plate 21*a*, when the bearing 47 is mounted on the left-side bearing receiver plate 21*a*. Thus, the flange portion 47*a* and the engaging protrusion 47*b* cooperate with each other to limit movement of the bearing 47 relative to the frame 21 in the axial direction of the tubular body portion.

The bearing 47 has a shaft receiver hole 47*d* formed through the tubular body portion, and the discharge roller shaft 29 is received in the shaft receiver hole 47*d*. The discharge roller shaft 29 is rotatable relative to the bearing 47 that serves as a slide bearing. The tubular portion of the bearing 47 has an outer circumferential surface including two flat portions 47*e*, 47*e* which are diametrically opposed to each other. The two flat portions 47*e*, 47*e* are diametrically spaced apart from each other by a distance V3 that is slightly smaller than the above-described width W2 of the cutout 54. Therefore, the bearing 47 can be easily introduced into the receiver hole 53 via the cutout 54, by brining the two flat portions 47*e*, 47*e* into substantially parallel to the cutout extending direction.

The bearing 47 includes: an arm portion 47*f* as a part of the above-described radially projecting portion; a rotation preventing protrusion 47*g* protruding from the arm portion 47*f* toward the bearing receiver plate 21*a*; and an operating lever portion 47*h* as another part of the radially projecting portion. The operating lever portion 47*h* extends from the arm portion 30*f* outwardly in the radial direction of the tubular body portion.

As shown in FIG. 9, the bearing receiver plate 21*a* further has a rotation preventing hole 55 that is provided by an elongated hole formed through the bearing receiver plate 21*a*. While the tubular body portion of the bearing 47 is received in the receiver hole 53, the rotation preventing protrusion 47*g* is received in the rotation preventing hole 55, for thereby limiting or preventing rotation of the bearing 47 relative to the frame 21. The rotation preventing hole 55 is located in a position, which causes the two flat portions 47*e*, 47*e* of the bearing 47 to be inclined with respect to the above-described cutout extending direction in which the cutout 54 extends from the receiver hole 53 when the rotation preventing protrusion 47*g* is received in the rotation preventing hole 55. That is, after the bearing 47 has been introduced into the receiver hole 53 via the cutout 54, with the two flat portions 47*e*, 47*e* being held in substantially parallel to the cutout extending direction, the bearing 47 is rotated relative to the frame 21, for introducing the rotation preventing protrusion 47*g* into the rotation preventing hole 55. Thus, once the rotation preventing protrusion 47*g* is introduced in the rotation preventing hole 55, the two flat portions 47*e*, 47*e* of the bearing 47 are no longer parallel to the above-described cutout extending direction, namely, are no longer parallel to the cutout defining portion of the peripheral surface of the bearing receiver plate 21*a*. Therefore, it is possible to prevent removal of the bearing 47 from the receiver hole 53 via the cutout 54, since the width W2 of the cutout 54 is smaller than a width (outside diameter) V4 of the tubular portion of the bearing 47 as measured at portions other than the flat portions 47*e*, 47*e*.

The bearing 47 further includes a backlash reducing protrusion 47*i* formed on the arm portion 47*f* such that a distance of the backlash reducing protrusion 47*i* from the tubular body portion is smaller than a distance of the rotation preventing protrusion 47*g* from the tubular body portion. Meanwhile the bearing receiver plate 21*a* has a backlash reducing face 54*a* that is provided in the cutout defining portion of the peripheral surface, such that the backlash reducing protrusion 47*i* is held in contact or engagement with the backlash reducing face 54*a* while the tubular portion of the bearing 47 is received in the receiver hole 53 with the rotation preventing protrusion 47*g* being received in the rotation preventing hole 55.

In the present embodiment, while the backlash reducing protrusion 47*i* is held in engagement with the backlash reducing face 54*a*, the backlash reducing protrusion 47*i* is elastically deformed in a direction including a component which is parallel to the above-described cutout extending direction and which is directed toward the receiver hole 53.

In introduction of the bearing 47 into the receiver hole 53, even after the rotation preventing protrusion 47*g* has been received in the rotation preventing hole 55, there still exists backlash or play between the bearing 47 and the receiver hole 53, particularly, in the cutout extending direction. This play between the bearing 47 and the receiver hole 53 can be effectively reduced by the elastic deformation of the backlash reducing protrusion 47*i* that has the direction including the above-described component, since the outer circumferential surface of the tubular body portion of the bearing 47 is biased or forced against an inner circumferential surface of the receiver hole 53, in an inward direction away from the opening of the cutout 54, by reaction of the elastically deformed backlash reducing protrusion 47*i*.

However, the elastic deformation of the backlash reducing protrusion 47*i* is not essential. That is, the bearing 47 and the bearing receiver plate 21*a* may be formed with high accuracy such that the play between the bearing 47 and the receiver hole 53 can be eliminated by simply bringing the backlash reducing protrusion 47*i* into contact or engagement with the with the backlash reducing face 54*a*, without causing the backlash reducing protrusion 47*i* to be elastically deformed.

As shown in FIG. 9, the bearing receiver plate 21*a* of the frame 21 further has a motor receiver hole 56 (in which the drive motor 41 is received) and a cutout 57 which is contiguous to the motor receiver hole 56 and which extends outwardly in a radial direction of the motor receiver hole 56, from the receiver hole 56 toward outside the bearing receiver plate 21*a*. The drive motor 41 is fixed to the bearing receiver plate 21*a*, by first introducing the drive shaft 41*a* of the motor 41 into the motor receiver hole 56 via the cutout 57, then fitting a boss portion of the motor 41 into the motor receiver hole 56, and then tightening screws 59, 59 (see FIG. 6) that are introduced through respective screw receiver holes 58, 58 of the bearing receiver plate 21*a*.

When the feed roller shaft 27 is to be attached to the frame 21, the retainer ring 38 is first received into the annular groove 27*a* of the shaft 27, and then the washer 39*b*, coil spring 40 and washer 39*a* are mounted onto the shaft 27 in this order of description. Then, the bearings 30, 31 are mounted onto respective opposite end portions of the shaft 27. After the bearing 30 has been mounted onto the shaft 27, the helical gear 34 is fixedly mounted onto the shaft 27, by means of press-fitting or suitable set screw. However, it is also possible to mount the helical gear 34 onto the shaft 27, before mounting the bearings 30, 31, washers 39*a*, 39*b*, coil spring 40 and retainer ring 38 onto the shaft 27.

Subsequently, the bearing 30 is introduced into the receiver hole 50 via the cutout 51. In this instance of introduction of the bearing 30 into the hole 50, the two flat portions 30*e*, 30*e* are held in substantially parallel to the cutout extending direction while the bearing receiver plate 21*a* is positioned between the flange portion 30*a* and the engaging protrusion 30*b* in the axial direction of the tubular body portion. After having been introduced into the receiver hole 50, the bearing 30 is rotated relative to the frame 21 with the operating lever portion 30*h* being manually operated for introducing the rotation preventing protrusion 30*g* into the rotation preventing hole 52.

Then, the rotation preventing protrusion 30*g* is introduced into the rotation preventing hole 52. In this instance, the backlash reducing protrusion 30*i* is brought into contact or engagement with the recessed portion 61*a* of the backlash reducing face 51*a*, whereby the backlash reducing protrusion 30*i* is elastically deformed. Since a distance between the backlash reducing protrusion 30*i* and the feed roller shaft 27 is smaller than a distance between the rotation preventing protrusion 30*g* and the feed roller shaft 27, namely, since a distance between the backlash reducing protrusion 30*i* and the operating lever portion 30*h* is larger than a distance between the rotation preventing protrusion 30*g* and the operating lever portion 30*h*, it is possible to cause the backlash reducing protrusion 30*i* to be easily deformed owing to a lever principle. It is noted that the other bearing 31 is attached to the right-side bearing receiver plates 21*b*, in the same manner as the attachment of the bearing 30 to the right-side bearing receiver plates 21*a*.

Since the backlash reducing protrusion 30*i* is provided in the arm portion 30*f* as the part of the radially projecting portion of the bearing 30 rather than in the tubular body portion of the bearing 30, the elastic deformation of the backlash reducing protrusion 30*i* does not cause deformation in an inner circumferential surface of the shaft receiver hole 30*d* that is formed through the tubular body portion, whereby rotation of the feed roller shaft 27 is not impeded. Further, since the outer circumferential surface of the tubular body portion of the bearing 30 is forced against the inner circumferential surface of the receiver hole 50, it is possible to limit play of the bearing 30 within the receiver hole 50.

When the discharge roller shaft 29 is to be attached to the frame 21, a retainer ring 63 such as a snap ring is first received into an annular groove of the shaft 29, and then the bearings 47, 47 are mounted onto respective opposite end portions of the shaft 29. The drive pulley 45 may be fixedly mounted onto the shaft 29 by means of press-fitting or suitable set screw, either before or after the retainer ring 62, bearings 47, 47 and drive pulley 45 are mounted onto the shaft 29.

Subsequently, each of the bearings 47, 47 is introduced into the receiver hole 53 via the cutout 54. In this instance of introduction of each bearing 47 into the hole 53, the two flat portions 47*e*, 47*e* are held in substantially parallel to the cutout extending direction while the bearing receiver plate 21*a* is positioned between the flange portion 47*a* and the engaging protrusion 47*b* in the axial direction of the tubular body portion. After having been introduced into the receiver hole 53, the bearing 47 is rotated relative to the frame 21 with the operating lever portion 47*h* being manually operated, for introducing the rotation preventing protrusion 47*g* into the rotation preventing hole 55.

Then, the rotation preventing protrusion 47*g* is introduced into the rotation preventing hole 55. In this instance, the backlash reducing protrusion 47*i* is brought into contact or engagement with the backlash reducing face 54*a*, whereby the backlash reducing protrusion 47*i* is elastically deformed. Since a distance between the backlash reducing protrusion 47*i* and the discharge roller shaft 29 is smaller than a distance between the rotation preventing protrusion 47*g* and the discharge roller shaft 29, namely, since a distance between the backlash reducing protrusion 47*i* and the operating lever portion 47*h* is larger than a distance between the rotation preventing protrusion 47*g* and the operating lever portion 47*h*, it is possible to cause the backlash reducing protrusion 47*i* to be easily deformed owing to a lever principle.

Since the backlash reducing protrusion 47*i* is provided in the arm portion 47*f* as the part of the radially projecting portion of the bearing 47 rather than in the tubular body portion of the bearing 47, the elastic deformation of the backlash reducing protrusion 47*i* does not cause deformation in an inner circumferential surface of the shaft receiver hole 47*d* that is formed through the tubular body portion, whereby rotation of the discharge roller shaft 29 is not impeded. Further, since the outer circumferential surface of the tubular body portion of the bearing 47 is forced against the inner circumferential surface of the receiver hole 53, it is possible to limit play of the bearing 47 within the receiver hole 53.

As is clear from the foregoing description, in the present embodiment, the above-described rotation preventer is constituted by the rotation preventing hole (52, 55) and the rotation preventing protrusion (30*g*, 47*g*), while the above-described backlash reducer is constituted by the backlash reducing face (51*a*, 54*a*) and the backlash reducing protrusion (30*i*, 47*i*). Further, the backlash reducing face (51*a*, 54*a*) and the backlash reducing protrusion (30*i*, 47*i*), which is held in engagement with the backlash reducing face (51*a*, 54*a*) and is elastically deformed, cooperate with each other to constitute a bearing biaser that biases the tubular body portion of the bearing (30, 31, 47) that is received in the receiver hole (50, 53), in an inward direction away from the opening of the cutout (51, 54).

There will be described an operation of the image recording apparatus 1 equipped with the bearing devices of the embodiment of the invention. The operation is initiated by setting the paper sheets P in the sheet-supplying cassette 3 and then introducing the sheet-supplying cassette 3 inside the main body 2 via the opening 2*a*. An uppermost one of the paper sheets P stacked in the sheet-supplying cassette 3 is separated by the sheet supply roller 6, from the other paper sheets P, so that the paper sheets P are sequentially fed in the sheet feed direction. When the fed paper sheet P comes into contact at its leading end with a nip portion defined between the feed roller shaft 27 and the driven roller 28, the paper sheet P is temporarily stopped, so that an inclination of the sheet P, if any, can be corrected owing to its contact with the nip portion.

Then, the drive motor 41 is rotated in the forward direction, and the forward rotation of the drive motor 41 is transmitted to the feed roller shaft 27 via the helical gears 42, 43, whereby the feed roller shaft 27 is rotated in its forward direction corresponding to the sheet feed direction, so as to perform an initial setting action in which the paper sheet P is fed by a predetermined distance to be positioned in a predetermined position.

The rotary disk 35 and the rotation detector 37 cooperate with each other to constitute the rotary encoder, as described above. The rotary disk 35 is rotated together with the rotation of the feed roller shaft 27, and the rotation of the rotary disk 35 is detected by the rotation detector 37. The drive motor 41 is controlled based on the detected rotation of the rotary disk 35, so as to perform the initial setting action for positioning the paper sheet P in the predetermined position.

A printing operation is performed by further feeding the paper sheet P in the sheet feed direction with the rotation of the feed roller shaft 27 in the forward direction. During the printing operation, too, the rotation of the rotary disk 35 is detected by the rotation detector 37, so that the drive motor 41 is controlled based on the output signal supplied from the detector 37. The recording head 4 is operated to eject ink droplets onto the paper sheet P while carriage 5 is being reciprocated after each intermittent feed motion of the paper sheet P, whereby a desired image or script is formed on the paper sheet P.

The feed roller shaft 27 is held by the pair of left-side and right-side bearing receiver plates 21*a*, 21*b* through the bearings 30, 31 each of which is fixed to a corresponding one of the bearing receiver plates 21*a*, 21*b* without substantial play thereof relative to the corresponding bearing receiver plate 21. This arrangement makes it possible to enable the feed roller shaft 27 to be rotated without suffering from its runout, and to accordingly enable the paper sheets P to be fed accurately. Further, the rotation of the feed roller shaft 27 without its runout leads to rotation of the rotary disk 35 without its runout, thereby making it possible to prevent contact of the rotary disk 35 with the rotation detector 37, which would cause scratch or other damage of the rotary disk 35.

Further, the discharge roller shaft 29 is held by the bearing receiver plates 21*a*, 21*b* through the bearings 47, 47 each of which is fixed to a corresponding one of the bearing receiver plates 21*a*, 21*b* without substantial play thereof relative to the corresponding bearing receiver plate 21. It is therefore possible to enable the discharge roller shaft 29 to be rotated without suffering from its runout, and to accordingly enable the paper sheets P to be fed accurately.

While the preferred embodiment of the invention has been described in detail by reference to the accompanying drawings, it is to be understood that the invention is not limited to the details of the illustrated embodiment, but may be embodied with various other changes, modifications and improvements, which may occur to those skilled in the art.

What is claimed is:

1. A bearing device comprising:

(a) a bearing supporting a shaft, and having (a-1) a tubular body portion in which said shaft is rotatably received and (a-2) a radially projecting arm that projects from said tubular body portion outwardly in a radial direction of said tubular body portion; and (b) a bearing receiver plate having (b-1) a receiver hole in which said tubular body portion of said bearing is received, and (b-2) a cutout which extends from said receiver hole and which has an opening that opens outwardly of said bearing receiver plate, such that said bearing can be introduced into said receiver hole via said cutout, wherein said bearing receiver plate and said radially projecting arm of said bearing cooperate with each other to establish (i) a rotation preventer preventing rotation of said bearing relative to said bearing receiver plate and (ii) a backlash reducer reducing play of said bearing relative to said bearing receiver plate, wherein said bearing receiver plate has a peripheral surface including a cutout defining portion that defines said cutout, wherein said backlash reducer has (ii-1) a backlash reducing face which is provided in said cutout defining portion of said peripheral surface of said bearing receiver plate, and (ii-2) a backlash reducing protrusion which is provided in said radially projecting arm of said bearing and which protrudes toward said bearing receiver plate, such that said backlash reducing protrusion is held in contact with said backlash reducing face while said tubular body portion of said bearing is received in said receiver hole of said bearing receiver plate, and wherein said backlash reducing protrusion is elastically deformed while being held in contact with said backlash reducing face.

2. The bearing device according to claim 1, wherein said rotation preventer has (i-1) a rotation preventing hole which is provided in said bearing receiver plate, and (i-2) a rotation preventing protrusion which is provided in said radially projecting arm of said bearing and which protrudes toward said bearing receiver plate, such that said rotation preventing protrusion is received in said rotation preventing hole while said tubular body portion of said bearing is received in said receiver hole of said bearing receiver plate.

3. The bearing device according to claim 2, wherein a distance between said backlash reducing protrusion and said tubular body portion in said radial direction is less than a distance between said rotation preventing protrusion and said tubular body portion in said radial direction.

4. The bearing device according to claim 2, wherein said backlash reducing protrusion is provided between said tubular body portion and said rotation preventing protrusion.

5. The bearing device according to claim 1, wherein said backlash reducing face includes a recessed portion, such that said backlash reducing protrusion is held in engagement with said recessed portion, and wherein said backlash reducing protrusion is elastically deformed while being held in engagement with said recessed portion.

6. The bearing device according to claim 5, wherein said backlash reducing protrusion is elastically deformed in a direction having a component parallel to a direction in which said cutout extends from said receiver hole.

7. The bearing device according to claim 1, wherein said backlash reducing protrusion is elastically deformed in a direction having a component parallel to a direction in which said cutout extends from said receiver hole.

8. The bearing device according to claim 1, wherein said backlash reducer includes a bearing biaser biasing said tubular body portion of said bearing that is received in said receiver hole, in an inward direction away from said opening of said cutout, and wherein said backlash reducing protrusion is elastically deformed while being held in contact with said backlash reducing face, so as to bias, as said bearing biaser, said tubular body portion of said bearing in said inward direction.

9. An image recording apparatus comprising:

a recording portion performing a recording operation onto a recording medium;

a feed roller shaft which is rotated for feeding the recording medium to said recording portion;

a discharge roller shaft which is rotated for discharging the recording medium from said recording portion; and the bearing device defined in claim 1, which supports each of at least one of said feed roller shaft and said discharge roller shaft.

10. The bearing device according to claim 1, wherein said backlash reducing protrusion of said backlash reducer protrudes, from said radially projecting arm of said bearing, in an axial direction of said tubular body portion of said bearing.

* * * * *